(12) United States Patent
Caplan (10) Patent No.: US 10,393,291 B2
(45) Date of Patent: Aug. 27, 2019

(54) EXPANDABLE WATER HOSE ASSEMBLY

(71) Applicant: Gregory Grant Caplan, London (GB)

(72) Inventor: Gregory Grant Caplan, London (GB)

(*) Notice: Subject to any disclaimer, the term of this patent is extended or adjusted under 35 U.S.C. 154(b) by 50 days.

(21) Appl. No.: 15/647,940

(22) Filed: Jul. 12, 2017

(65) Prior Publication Data

US 2018/0306353 A1    Oct. 25, 2018

(30) Foreign Application Priority Data

Apr. 21, 2017   (GB) .................................. 1706396.7

(51) Int. Cl.
| | |
|---|---|
| *F16L 11/00* | (2006.01) |
| *F16L 11/20* | (2006.01) |
| *F16L 11/12* | (2006.01) |
| *F16L 33/01* | (2006.01) |
| *F16L 33/207* | (2006.01) |
| *B05B 15/65* | (2018.01) |
| *F16L 33/22* | (2006.01) |

(52) U.S. Cl.
CPC ............... *F16L 11/20* (2013.01); *F16L 11/12* (2013.01); *F16L 33/01* (2013.01); *F16L 33/2071* (2013.01); *B05B 15/65* (2018.02); *F16L 33/227* (2013.01)

(58) Field of Classification Search
CPC .............. A47L 9/24; F16L 11/20; F16L 33/01
USPC ................... 138/118, 119, 109; 15/314, 414; 239/195, 281, 196, 525, 533.1
See application file for complete search history.

(56) References Cited

U.S. PATENT DOCUMENTS

| | | | | |
|---|---|---|---|---|
| 4,927,191 | A * | 5/1990 | Mikol | F16L 11/111 138/121 |
| 5,829,483 | A * | 11/1998 | Tukahara | F16L 9/18 138/109 |
| 6,523,539 | B2 * | 2/2003 | McDonald | A62B 7/14 128/205.25 |
| 7,520,302 | B2 * | 4/2009 | Smith | F16L 11/1185 138/118 |

(Continued)

FOREIGN PATENT DOCUMENTS

| | | |
|---|---|---|
| CN | 203770873 U | 8/2014 |
| DE | 202015100073 U1 | 2/2015 |
| GB | 2561614 A | 10/2018 |

*Primary Examiner* — Patrick F Brinson
(74) *Attorney, Agent, or Firm* — Kwan & Olynick LLP (57) ABSTRACT

An expandable water hose assembly comprises a water hose and coupling means. The water hose comprises a flexible outer tube, a collapsible water impermeable flexible inelastic inner tube located inside the outer tube, and an elastic flexible member located inside the collapsible water impermeable flexible inelastic inner tube. The outer tube, collapsible inner tube, and elastic flexible member are movable from a retracted storage configuration to an extended deployed configuration upon application of water pressure within the water hose assembly. The elastic flexible member is in an untensioned state while in the retracted storage configuration and a tensioned state while in the extended deployed configuration. Upon removal of water pressure from within the water hose assembly, the elastic flexible member may return to its untensioned state and applies a retracting force to the hose assembly to urge the collapsible inner tube into a retracted storage configuration.

20 Claims, 12 Drawing Sheets

(56) References Cited

U.S. PATENT DOCUMENTS

| | | | |
|---|---|---|---|
| 8,757,213 B2* | 6/2014 | Berardi | F16L 11/00 |
| | | | 138/118 |
| 8,936,046 B2* | 1/2015 | Ragner | F16L 11/118 |
| | | | 138/119 |
| 9,127,791 B2* | 9/2015 | Ragner | F16L 11/118 |
| 9,709,194 B1* | 7/2017 | Pan | F16L 11/20 |
| 9,964,239 B2* | 5/2018 | Disbrow | F16L 11/12 |
| 2002/0013974 A1* | 2/2002 | Gibson | A47L 9/24 |
| | | | 15/315 |

* cited by examiner

Figure 15

EXPANDABLE WATER HOSE ASSEMBLY

CROSS-REFERENCE TO RELATED APPLICATIONS

This application claims priority under 35 U.S.C. § 119 to United Kingdom Patent Application No. 1706396.7 filed on Apr. 21, 2017, the disclosure of which is incorporated herein by reference in its entirety.

TECHNICAL FIELD

The disclosure relates to an expandable water hose assembly. More particularly but not exclusively the disclosure relates to an expandable garden water hose assembly.

BACKGROUND

Figure 1:
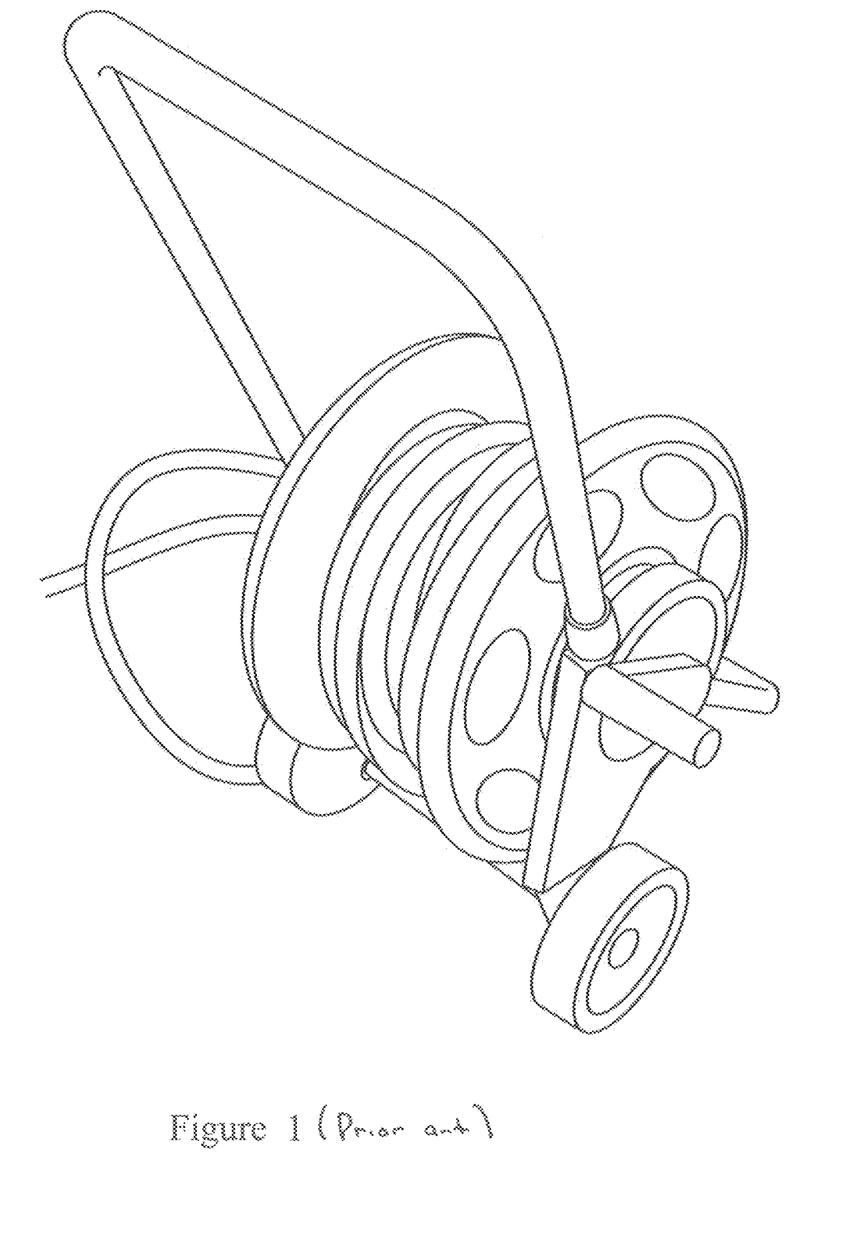
FIG. 1 is a perspective view of a conventional hose pipe wrapped around a reel.

Typical hose pipes are between 5 to 30 meters in length and can deliver water to a large area of land. Such hose pipes when not in use are often wrapped round a reel, as illustrated in FIG. 1, so as to improve the aesthetic appearance of a garden, remove potential trip hazards, and prevent environmental degradation to the hose typically as a result of exposure to UV radiation. The hose pipe and reel are however bulky, weighing on average between 5 to 10 kg, which may cause difficulties to a user when moving the reel. Furthermore, it is time-consuming for a user to have to unwind and rewind the hose after each use.

Figure 2:
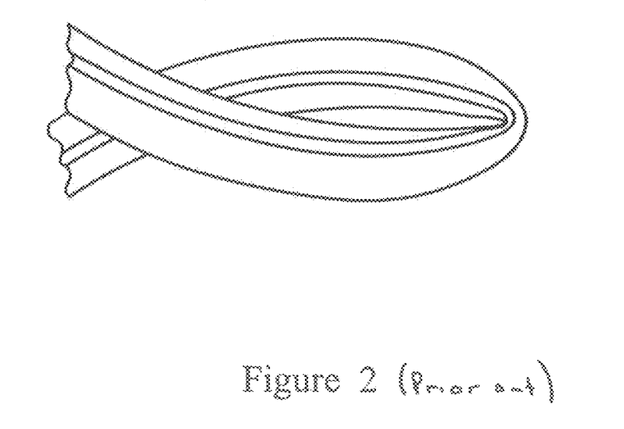
FIGS. 2 and 3 show a kinked conventional hose pipe.
Figure 3:
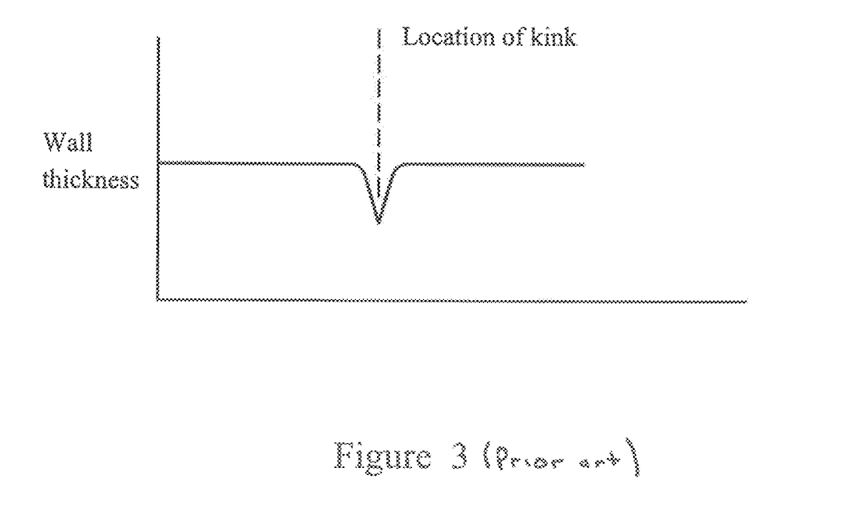

A further problem associated with commonly available hosepipes is that they are composed of only a single tube. In order for these hose pipes to be robust enough for regular use they typically have a substantial sidewall, several millimeters thick, made from extruded plastic material. A problem associated with hose pipes comprising thick sidewalls is there tendency to kink as illustrated in FIGS. 2 and 3. A kink is a disruption in the uniformity of the cross-section of the tubular sidewall, which is typically caused by the tube bending back upon itself at an acute angle such that the plastics material forming the sidewall is thinned at the apex of the kink or along a line adjacent to the kink. Such kinks in practice tend to lead to either a partial or complete interruption of the fluid supplied during use until the user manually removes the kink by straightening the hose. However, once the sidewall has been thinned by a kink, the hose will tend to kink again repeatedly at the same point of weakness.

GB 2490276 discloses a hose which automatically expands longitudinally and laterally upon application of fluid pressure. The hose automatically expands longitudinally up to six times its unexpanded or contracted length. Upon release of the fluid pressure within the hose, the hose automatically contracts to a contracted state. The hose includes an inner tube made from an elastic material and an outer tube made from a non-elastic material. The inner tube is positioned concentrically within the outer tube in both a contracted state and an expanded state. The outer tube is secured to the inner tube at a first end of the inner and outer tubes and at a second end of the inner and outer tubes. The outer tube moves laterally and longitudinally with respect to the inner tube when the tubes are transitioning between a contracted state and an expanded state.

SUMMARY

A problem associated with commonly available expandable hose pipes is that the wall thickness of the inner tube thins upon expansion. Water pressure exerted on these thinned regions often leads to rupturing after a relatively short period of repeated use.

In some embodiments, an expandable water hose assembly comprises:
- a water hose, the hose comprising:
  - a flexible outer tube;
  - a collapsible water impermeable flexible inelastic inner tube located inside the outer tube; and
  - an elastic flexible member located inside the collapsible water impermeable flexible inelastic inner tube; and
- a first and second coupling means;
- the outer tube, collapsible inner tube, and elastic flexible member being secured at a first end to the first coupling means and at a second end to the second coupling means;
- the outer tube, collapsible inner tube, and elastic flexible member being movable from a retracted storage configuration to an extended deployed configuration upon application of water pressure within the garden hose assembly;
- the elastic flexible member being in an untensioned state whilst in the retracted storage configuration and a tensioned state whilst in the extended deployed configuration;
- wherein upon removal of water pressure from within the garden hose assembly the elastic flexible member may return to its untensioned state and applies a retracting force to the hose assembly to urge the collapsible inner tube into a retracted storage configuration.

The flexible outer tube and the collapsible flexible inelastic inner tube of the expandable water hose assembly are sufficiently flexible to allow the hose pipe to be bent or twisted in any direction without kinking. The term collapsible includes folding, compressing, compacting, or any further means of reducing the axial length of the collapsible flexible inelastic inner tube.

The elastic flexible member is stretched axially, and thereby tensioned, upon application of water pressure. Upon removal of the water pressure the water hose returns to the retracted storage configuration. This arrangement removes the need of having to stretch the flexible outer tube in order to affect retraction of the water hose to a storage configuration upon removal of water pressure.

The flexible outer tube may be in an untensioned state whilst in the retracted storage configuration and a tensioned state whilst in an extended deployed configuration. Upon removal of water pressure from within the garden hose assembly the flexible outer tube may return to its untensioned state, and the flexible outer tube and elastic flexible member may collectively apply a retracting force to the hose assembly to urge the collapsible flexible inelastic inner tube into the retracted storage configuration. This arrangement enables axial stretching of the elastic flexible member, along with axial stretching/expansion, of the flexible outer tube upon application of water pressure. Upon removal of water pressure, the water hose returns to the retracted storage configuration.

Preferably longitudinal axial expansion/stretching occurs across the entire length of the elastic flexible member. Alternatively, axial expansion/stretching occurs across a portion or portions of the elastic flexible member.

The maximum length and width of the collapsible flexible inelastic inner tube in a fully extended deployed configuration is set at manufacture. Accordingly, the maximum length and width of the collapsible flexible inelastic inner tube cannot be increased through expansion of the material, akin to the elastic stretching of a balloon, upon application of a water pressure to the expandable water hose assembly.

Therefore, the total length of the collapsible flexible inelastic inner tube when fully extended determines the total length of the hose pipe.

The maximum length of the water hose when in a fully extended configuration may be 7.62 m to 30.5 m.

The fully extended deployed length of the water hose may be 1.5 to 6 times the retracted storage length, preferably 3 to 5 times the retracted storage length.

The width of the flexible outer tube when in a fully extended configuration may be 1.5 cm to 5 cm, preferably 2 cm to 4 cm.

The water hose should be robust enough to withstand pressures produced by a mains water supply of up to 8 bar. The water hose preferably requires at least 2 bar to enter an extended deployed configuration, and preferably 4 bar to achieve a fully extended deployed configuration. Preferably, the restoring force of the elastic flexible member is less than the 2 bar pressure exerted by the main water supply. Alternatively, the collective restoring force of the elastic flexible member and the flexible outer tube is less than the 2 bar pressure exerted by the main water supply.

The flexible outer tube may be connected to the collapsible flexible inelastic inner tube. Preferably, the flexible outer tube and the collapsible flexible inelastic inner tube are not connected to each other to prevent rupturing upon application of water pressure within the water hose.

Upon application of water pressure to the expandable water hose assembly the elastic flexible member stretches axially, increasing the distance between the first and second coupling means, thereby moving the flexible outer tube and the collapsible inner tube from the retracted storage configuration to an extended deployed configuration. Little or no radial expansion of the elastic flexible member occurs.

The maximum stretch of the elastic flexible member may equal the maximum length of the collapsible flexible inelastic inner tube when in a fully extended configuration. Preferably, the maximum stretch of the elastic flexible member is less than the maximum length of the collapsible flexible inelastic inner tube when in a fully extended configuration.

The elastic flexible member may be cylindrical, preferably the elastic flexible member is solid cylindrical. A solid cylindrical elastic flexible member has the advantage of increased structural integrity, thereby prolonging the life span of the water hose during repeated use.

The elastic flexible member may be an elongate band.

The elastic flexible member may be composed of a polymer. Alternatively, the elastic flexible member may be composed of or coated with a natural rubber. Alternatively, the elastic flexible member may be composed of a stretch fabric material.

The length of the elastic flexible member in the untensioned state may be 12.2 m to 24.4 m, preferably 15.2 m to 21.3 m.

The width of the elastic flexible member in the untensioned state may be 0.5 cm to 4 cm, preferably 0.5 cm to 2.5 cm.

The elastic flexible member may be secured to the outside of at least one of the first and second coupling means. Preferably, the elastic flexible member is secured within at least one of the first and second coupling means. The elastic flexible member may be secured to the first and second coupling means by a flattened crimp. Alternatively, the elastic flexible member may be tied to the first and second coupling means. Alternatively, the elastic flexible member may be chemically bonded to the first and second coupling means.

The elastic flexible member may be connected to the collapsible impermeable inner tube. Preferably, elastic flexible member and the impermeable flexible inelastic inner tube are not connected to each other.

In some embodiments, the flexible outer tube may be collapsible. The term collapsible includes folding, compressing, compacting, or any further means of reducing the axial length of the flexible outer tube. In some embodiments, the flexible outer tube may be elastic.

In some embodiments, the collapsible outer tube may be both collapsible and elastic. This arrangement, for example, allows for a reduction in the need to stretch the flexible outer tube to achieve a fully extended deployed configuration.

The flexible outer tube may comprise elastic warp portions and inelastic weft portions. The terms warp and weft are commonly used in the art to describe weaved arrangements of fibres within a piece of material. Weft fibres are inserted over and under the lengthwise warp fibres. The elastic warp fibres allow the flexible outer tube to stretch axially, whilst the inelastic weft fibres restrict radial expansion/stretching. Preferably, radial expansion/stretching occurs across the entire length of the flexible outer tube. Alternatively, radial expansion/stretching occurs across a part or parts of the flexible outer tube.

In some embodiment, the flexible outer tube may be inelastic.

In some embodiments, the collapsible outer tube may be both collapsible and inelastic.

The flexible outer tube may have flexible wall portions moveable between its storage and extended deployed configurations. Preferably, the flexible wall portions are formed as compressible bellows sections. The compressible bellows sections enable the outer tube to be compressed to a greater extent, thereby reducing the length of the flexible outer tube when in the retracted storage configuration.

Rigid wall portions may be provided among the bellows sections of the flexible outer tube to increase the structural resilience of the outer tube. This is particularly favourable when the flexible outer tube is an extended deployed configuration.

The flexible outer tube may be composed of a woven, knitted fabric or webbing material. Preferably, the outer tube is impermeable to water. The outer tube may however be permeable to water.

The collapsible flexible inelastic inner tube may have flexible wall portions moveable between its storage and extended deployed configurations. Preferably, the flexible wall portions are formed as compressible bellows sections. The compressible bellows sections enables the inner tube to be compressed to a greater extent, thereby reducing the length of the inner tube when in the retracted storage configuration.

Rigid wall portions may be provided among the bellows sections of the inner tube to increase the structural resilience of the outer tube. This is particularly favourable when the collapsible flexible inelastic inner tube is in an extended deployed configuration.

The collapsible flexible inelastic inner tube may be composed of a polymer. Alternatively, the collapsible flexible inelastic inner tube may be composed of rubber. The walls of the collapsible flexible inelastic inner tube and sufficiently thick to ensure that the inner tube is resistant to rupturing upon application of water pressure to the expandable water hose assembly.

The collapsible flexible inelastic inner tube may radially contact the flexible outer tube when in an extended deployed configuration. Preferably, the collapsible flexible inner tube contacts the flexible outer tube across its entire length.

Preferably, the collapsible flexible inelastic inner tube is resistant to further axial expansion when in the fully deployed configuration is. This minimises the possibility of the inner tube rupturing.

Preferably the first coupling means may be a female coupler and the second coupling means may be a male coupler. Alternatively, the first coupling means may be a male coupler and the second coupling means may be a female coupler.

The first coupler may be connected to a tap, faucet, valve, or other suitable water delivery means. The second coupler preferably contains a fluid restrictor. The fluid restrictor may be a rigid tubular member, nozzle, spray head or similar valve means. The fluid restrictor restricts the flow of water at or near the downstream end of the hose.

The flexible outer tube and/or the collapsible flexible inelastic inner tube may be secured within the female coupler means by a flattened crimp and to a threaded portion of the male coupler means by a flattened crimp. Alternatively, the flexible outer tube and/or the collapsible flexible inelastic inner tube may be tied to the first and second coupling means. Alternatively, the flexible outer tube and/or the collapsible flexible inelastic inner tube may be chemically bonded to the first and second coupling means.

The elastic flexible member may be secured within the female coupler means by a flattened crimp and to a threaded portion of the male coupler means by a flattened crimp. Alternatively, the elastic flexible member may be tied to the first and second coupling means. Alternatively, the elastic flexible member may be chemically bonded to the first and second coupling means.

The expandable water hose assembly is lightweight, and the water hose can be folded back on itself after use to save space.

The disclosure is further described by means of example, but not in any limitative sense, with reference to the accompanying drawings, of which:

DETAILED DESCRIPTION

FIG. 1 shows a conventional method of storing a hose pipe by wrapping the hose pipe around a reel.

FIGS. 2 and 3 show a kinked conventional hose pipe.

Figure 4:
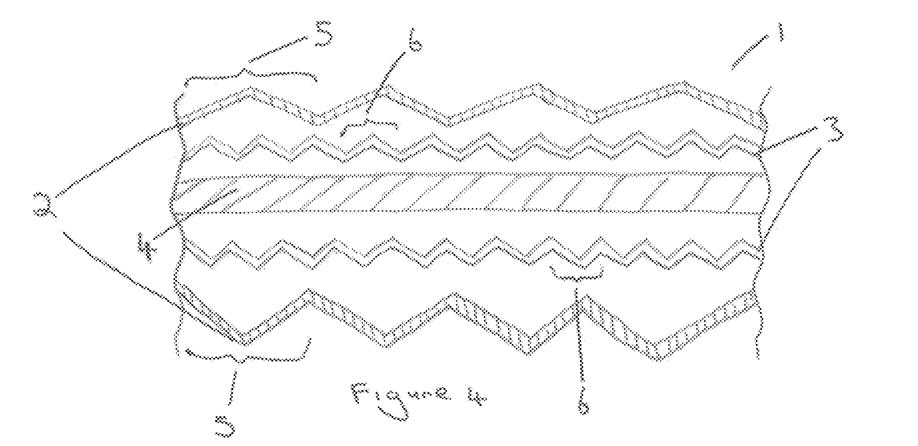
FIG. 4 is a cross-sectional view of an embodiment of the expandable water hose assembly in a retracted storage configuration.

FIG. 4 shows a water hose 1 of the expandable water hose assembly in a retracted storage configuration. The water hose 1 comprises a collapsible flexible outer tube 2, a collapsible water impermeable flexible inelastic inner tube 3, and an elastic flexible member 4. The collapsible flexible outer tube 2 has an array of inelastic flexible side wall portions 5 which are formed as compressible bellow sections, forming a concertinaed arrangement. The collapsible flexible outer tube is attached to first and second coupling means (not shown) at either end. The collapsible flexible inelastic inner tube 3 is located inside the collapsible flexible outer tube and is attached to the first and second coupling means at either end. The collapsible flexible inelastic inner tube 3 has an array of inelastic flexible side wall portions 6 which are formed as compressible bellow sections, forming a concertinaed arrangement. The elastic flexible member 4 is located inside the collapsible flexible inelastic inner tube 3 and consists of a solid cylindrical piece of material attached to the first and second coupling means at either end. The elastic flexible member 4 is in an untensioned state when in the retracted storage configuration.

Figure 5:
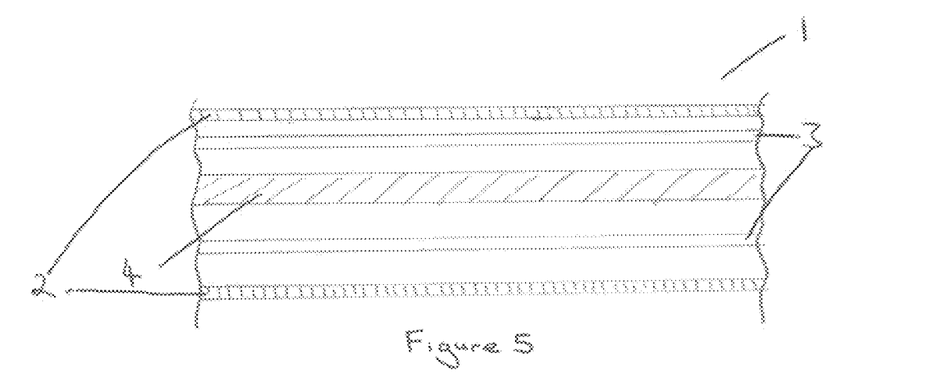
FIG. 5 is a cross-sectional view of the water hose of FIG. 4 in an extended deployed configuration.

FIG. 5 shows the water hose 1 of FIG. 4 in a fully extended deployed configuration. Each of the side walls of the flexible outer tube 2 and the collapsible flexible inelastic inner tube 3 are substantially longitudinally linear. The flexible outer tube 2 and the collapsible flexible inelastic inner tube 3 have substantially the same thickness when in the retracted storage configuration (as seen in FIG. 4) and the deployed/fully deployed configuration. The elastic flexible member 4 is stretched when in the deployed/fully deployed configuration and therefore has a reduced thickness when compared to the elastic flexible member 4 when in the retracted storage configuration.

In use of the water hose assembly of FIGS. 4 and 5, upon introduction of water pressure the collapsible flexible outer tube 2, collapsible flexible inelastic inner tube 3 and the elastic flexible member 4 move from the retracted storage configuration to an extended deployed configuration. Initially, water is introduced into the collapsible flexible inelastic inner tube 3 and a water pressure is exerted within the water hose assembly which starts to inflate the flexible inelastic inner tube 3. As the water pressure increases the collapsible flexible inelastic inner tube 3 expands axially and further inflates radially, the collapsible flexible outer tube 2 expands axially and inflates radially, and the elastic flexible member 4 stretches axially. Expansion of the side walls of the collapsible flexible outer tube 2 and the inelastic inner tube 3 continues until they are substantially longitudinally linear. As the sidewalls of the collapsible flexible outer tube 2 and the inelastic inner tube 3 are not composed of elastomeric material, further axial expansion ceases once the sidewalls are longitudinally linear. Furthermore, as the flexible outer tube 2 and the inelastic inner tube 3 are not composed of an elastomeric material upon acquiring their maximum diameter (pre-set at manufacture) further expansion radially is prevented. Upon removal of water pressure form the expandable water hose assembly, the tensioned elastic flexible member 4 applies a retracting force to the hose assembly to urge the collapsible flexible inelastic inner tube 3 into the retraced storage configuration.

Figure 6:
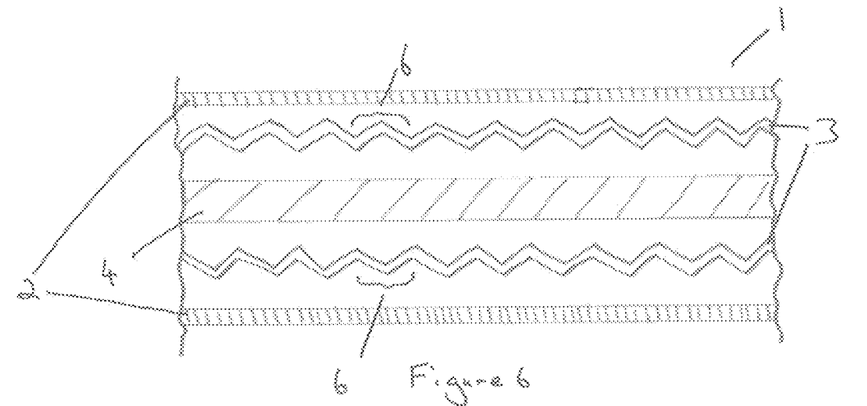
FIG. 6 is a cross-sectional view of an embodiment of the expandable water hose assembly in a retracted storage configuration.

FIG. 6 shows an alternative water hose 1 of the expandable water hose assembly in a retracted storage configuration. The water hose 1 comprises an elastic flexible outer tube 2, a collapsible water impermeable flexible inelastic inner tube 3, and an elastic flexible member 4. The elastic flexible outer tube 2 has longitudinally linear side walls and is attached to first and second coupling means (not shown) at either end. The collapsible flexible inelastic inner tube 3 is located inside the elastic flexible outer tube 2 and is attached to the first and second coupling means at either end. The collapsible flexible inelastic inner tube 3 has an array of inelastic flexible side wall portions 6 which are formed as compressible bellow sections, forming a concertinaed arrangement. The elastic flexible member 4 is located inside the collapsible flexible inelastic inner tube 3 and consists of a solid cylindrical piece of material attached to the first and second coupling means at either end. The elastic flexible member 4 is in an untensioned state when in the retracted storage configuration.

Figure 7:
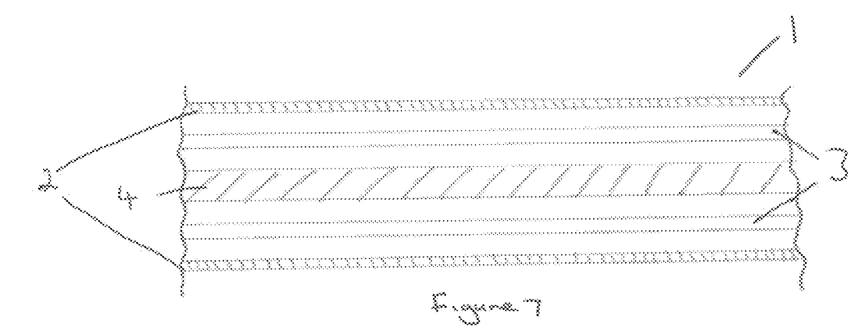
FIG. 7 is a cross-sectional view of the water hose of FIG. 6 in an extended deployed configuration.

FIG. 7 shows the water hose 1 of FIG. 6 in a fully extended deployed configuration. The side walls of the collapsible flexible inelastic inner tube 3 are substantially longitudinally linear and have substantially the same thickness when in the retracted storage configuration (as seen in FIG. 6) and the fully deployed configuration. The elastic flexible member 4 is stretched when in the fully deployed configuration and therefore has a reduced thickness when compared to the elastic flexible member 4 in the retracted storage configuration. The side walls of the elastic flexible outer tube 2 are also stretched when in the deployed/fully deployed configuration and therefore has a reduced thickness when compared to the elastic flexible outer tube 2 in the retracted storage configuration.

In use of the water hose assembly of FIGS. 6 and 7, upon introduction of water pressure the elastic flexible outer tube 2, inelastic inner tube 3 and elastic flexible member 4 move from the retracted storage configuration to an extended deployed configuration. Initially water is introduced into the collapsible flexible inelastic inner tube 3 and a water pressure is exerted within the water hose assembly which starts to inflate the collapsible inelastic inner tube 3. As the water pressure increases the collapsible flexible inelastic inner tube 3 expands axially and further inflates radially, the elastic flexible outer tube 2 stretches axially and inflates radially, and the elastic flexible member 4 stretches axially. Expansion of the side walls of the collapsible flexible inelastic inner tube 3 continues until they are substantially longitudinally linear. As the sidewalls of the collapsible flexible inelastic inner tube 3 are not composed of elastomeric material further axial expansion ceases once the sidewalls are longitudinally linear. Furthermore, as the collapsible flexible inelastic inner tube 3 is not composed of elastomeric material, upon acquiring its maximum diameter (pre-set at manufacture) further expansion radially is prevented. Upon removal of water pressure form the expandable water hose assembly, the tensioned elastic flexible member 4 and the elastic flexible outer tube 2 collectively apply a retracting force to the hose assembly to urge the inelastic inner tube 3 into the retraced storage configuration.

Various modifications will be apparent to those skilled in the art. In respect to the water hose assembly shown in FIGS. 4 and 5, the flexible outer tube 2 may also be in a tensioned state when in a deployed configuration. Consequently, the tensioned elastic flexible member 4 and the collapsible flexible outer tube 2 collectively apply a retracting force to the hose assembly to urge the inelastic inner tube 3 into the retraced storage configuration. The collapsible flexible outer tube 2 may also be composed of elastomeric material.

Figure 8:
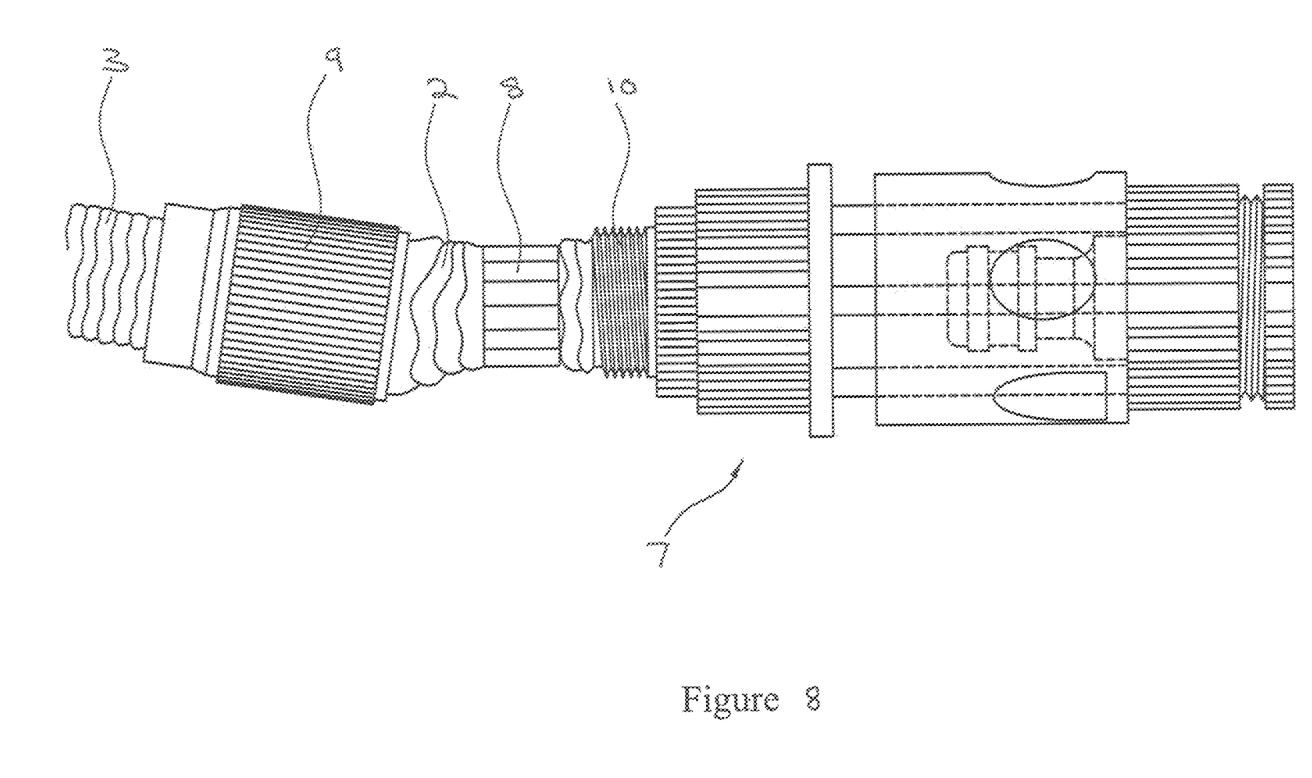
FIG. 8 is a part cross-sectional side view of the water hose connected to a female coupler.

FIG. 8 shows the general arrangement of a female coupler 7, of a type suitable for use with the currently described embodiments. The flexible outer tube 2 and collapsible water impermeable flexible inelastic inner tube 3 are both firmly connected to the female coupler 7 by a crimped metal tie 8, which is sufficiently tight as to prevent any fluid leakage. The female coupler 7 may be made of brass, brass coated aluminium or a suitable rigid plastics material. A screwably detachably protective metal sleeve 9 is connected to a threaded portion 10 of the female coupler 7.

Figure 9:
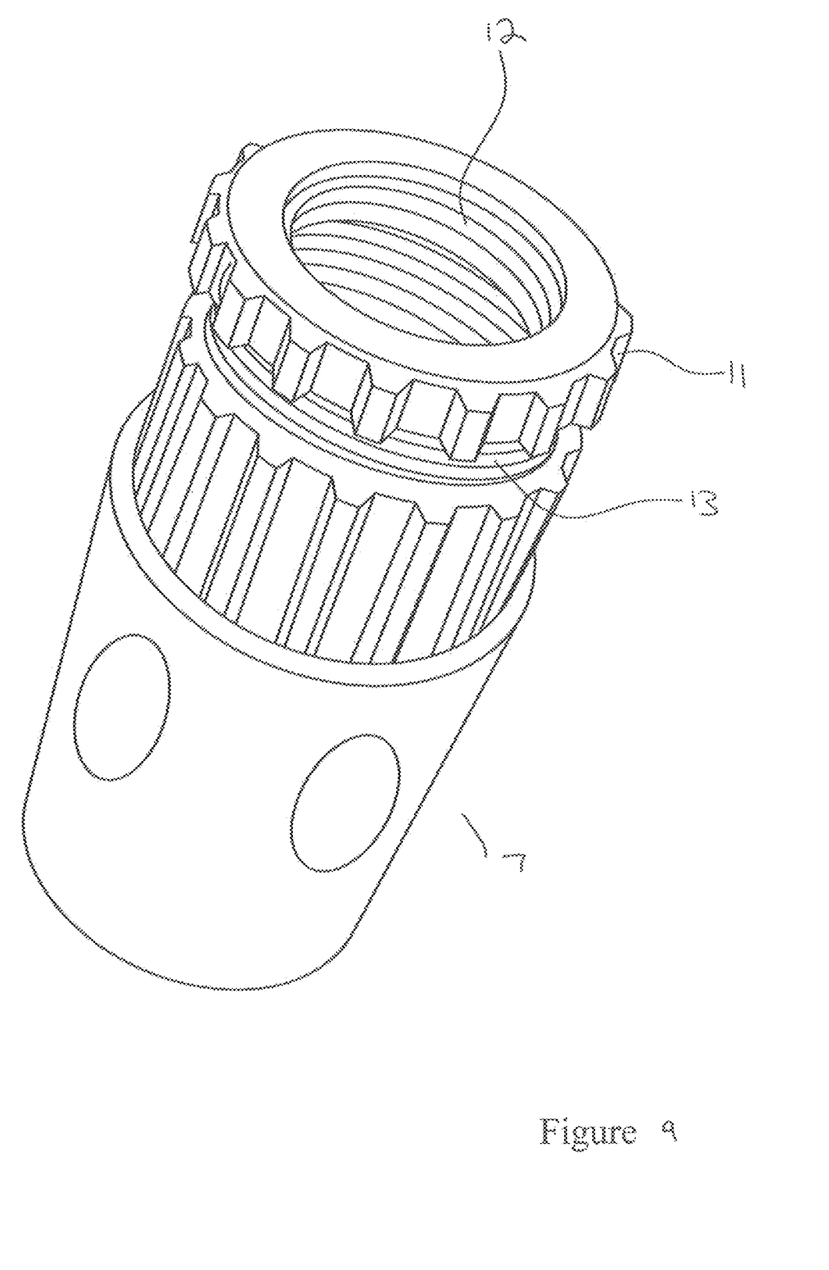
FIG. 9 is a perspective view of the female coupler of FIG. 8.
Figure 10:
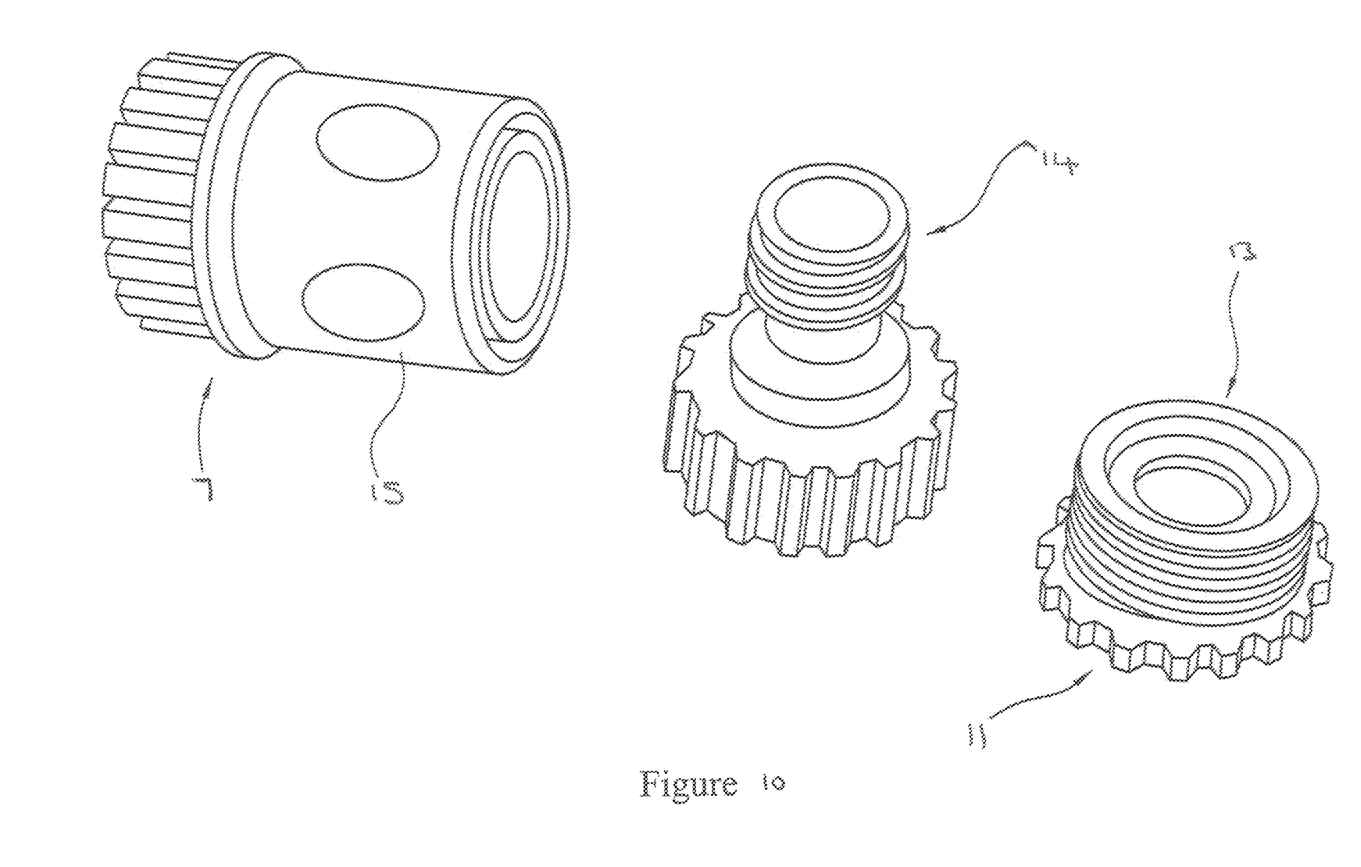
FIG. 10 is a perspective view of the female coupler of FIG. 8.

FIGS. 9 and 10 shows the female coupler 7 of FIG. 8. The female coupler further comprises a detachable collar 11. The detachable collar 11 includes an inner threaded portion 12 for connecting to the screw thread of a standard outdoor tap (not shown). The detachable collar 11 is connected, via a further screw thread 13 to a snap fit bayonet connector 14. The snap fit bayonet connector 14 is securely fitted into the main body 15 of the female coupler 7 via the snap fit bayonet connector 14.

Figure 11:
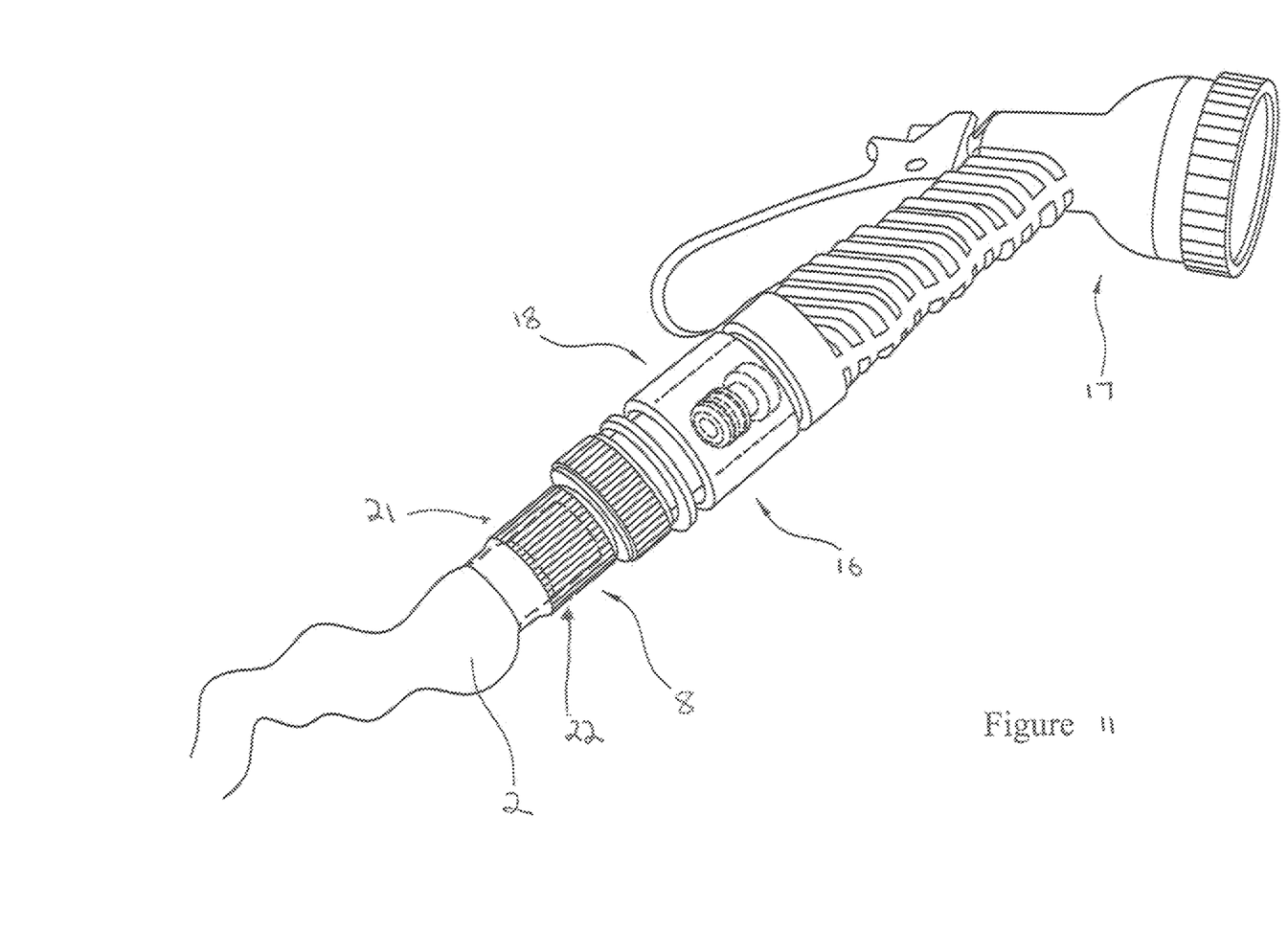
FIG. 11 is a part cross-sectional perspective view of the water hose connected to a male coupler incorporating spray head attached.
Figure 12:
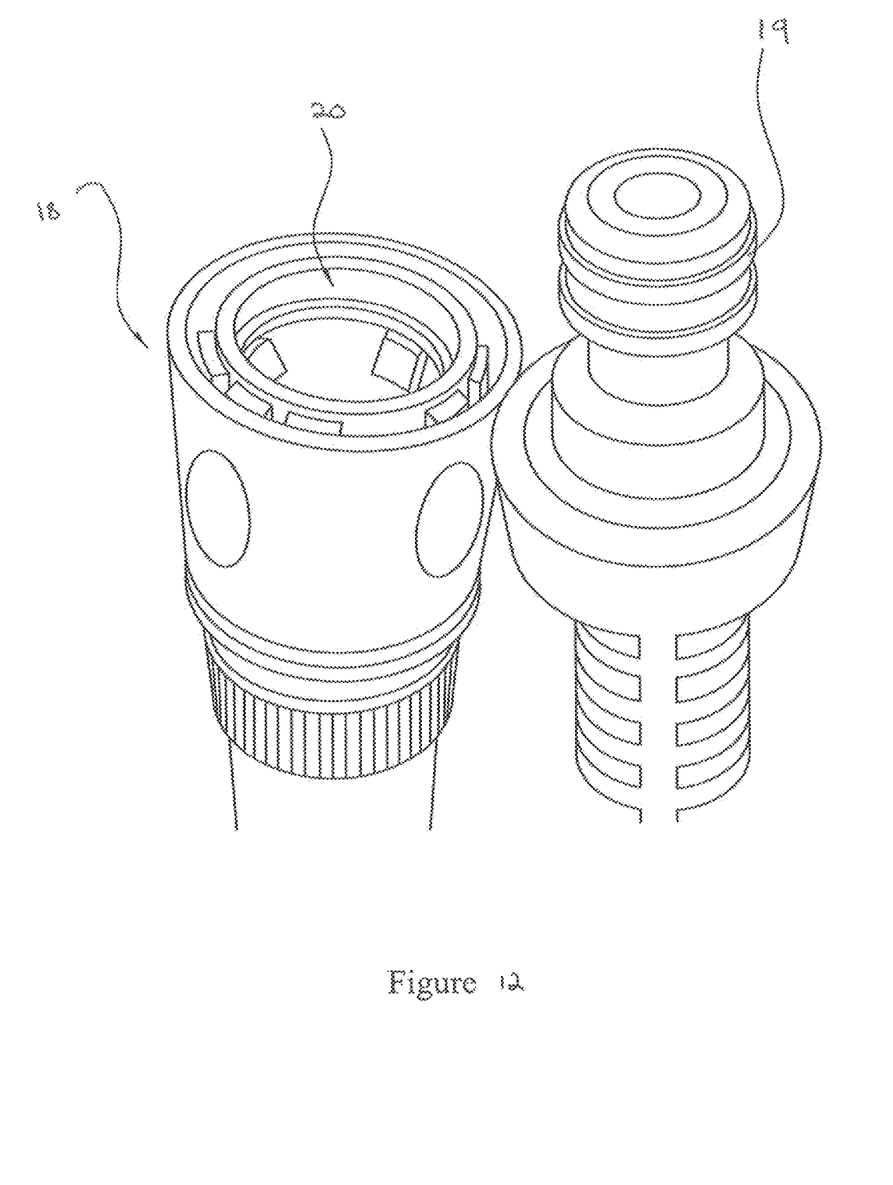
FIG. 12 is a perspective view of the male coupler of FIG. 11.
Figure 13:
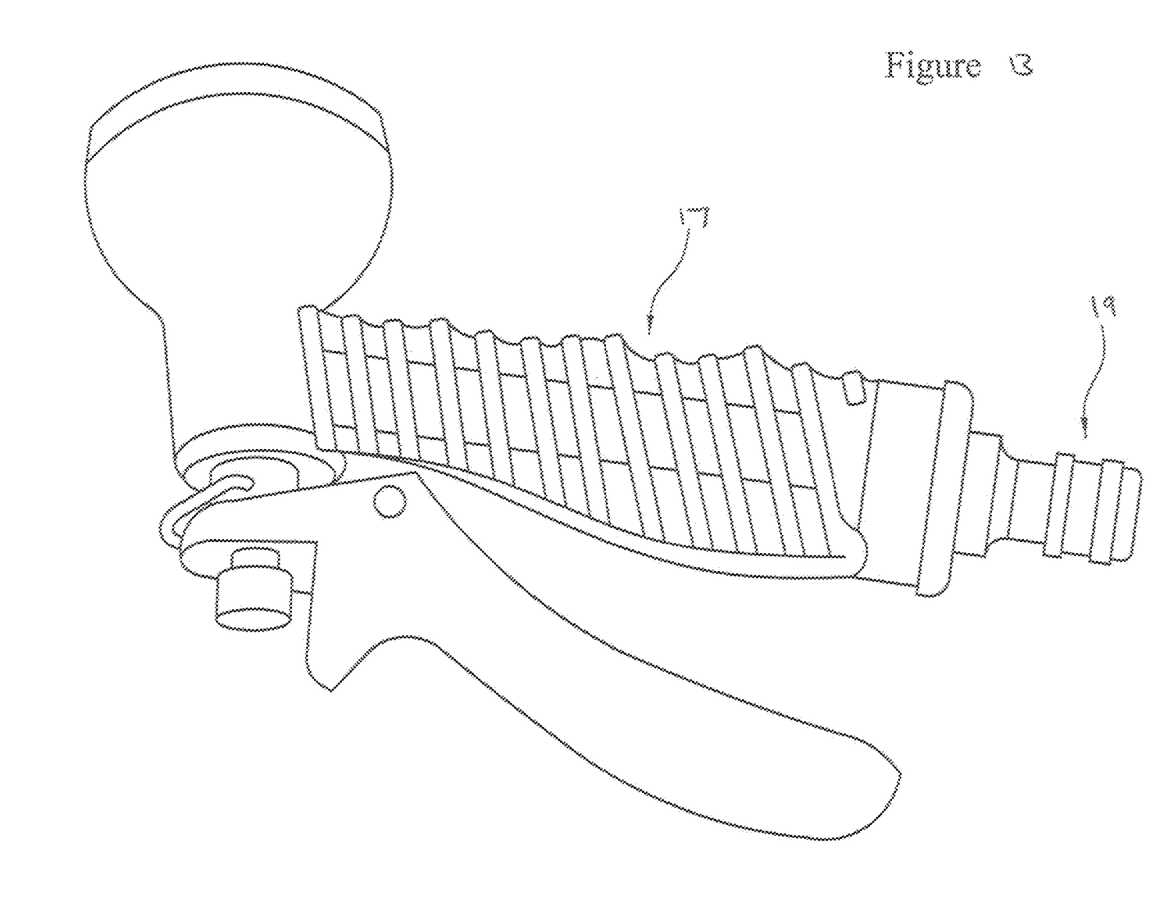
FIG. 13 is perspective view of the spray head of FIG. 11.

FIGS. 11 to 13 show a male coupler 16, of a type suitable for use with the currently described embodiments. A sprayhead 17, which acts as a flow restrictor, is detachably connected to the main body 18 of the male coupler 16 by a snap fit bayonet connector 19 located on the sprayhead 17. The snap fit bayonet connector 19 is adapted to be received within the receiving part 20 of the main body 18 to secure the sprayhead 17 to the male coupler 16.

In FIG. 13 the flexible outer tube 2 collapsible water impermeable flexible inelastic inner tube 3 (not shown) are both firmly connected to a threaded portion 21 of the male coupler 16 by a crimped metal tie 8 which is sufficiently tight so as to prevent any fluid leakage during use. A protective metal jacket 22 is screwably connected to the threaded portion 21 of the male coupler 16 so as to provide additional protection for the connection.

Figure 14:
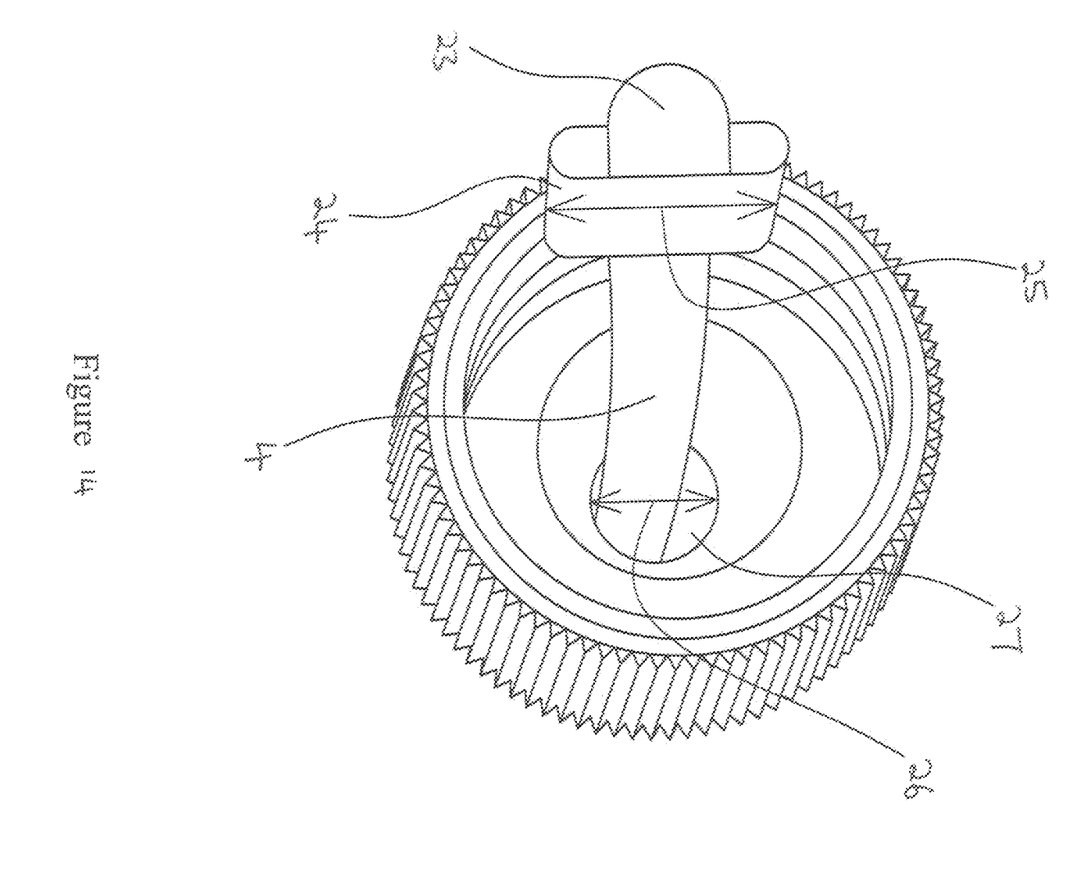
FIG. 14 is a perspective view of an elastic flexible member connected to a coupling means.

FIG. 14 shows how the elastic flexible member 4 can be connected to the male 16 and female 7 couplers. At each end 23 of the elastic flexible member 4, there is a flattened crimp member 24, which is preferably made of metal or some other rigid material. The length 25 of the flattened crimp member 24 is greater than the diameter 26 of the inner cylindrical tubular portion 27 of both the male and female couplers. This arrangement is provided at both ends of the hose assembly and ensures that elastic flexible member 4 reliably retracts the inelastic inner tube 3 once fluid pressure is removed.

Figure 15:
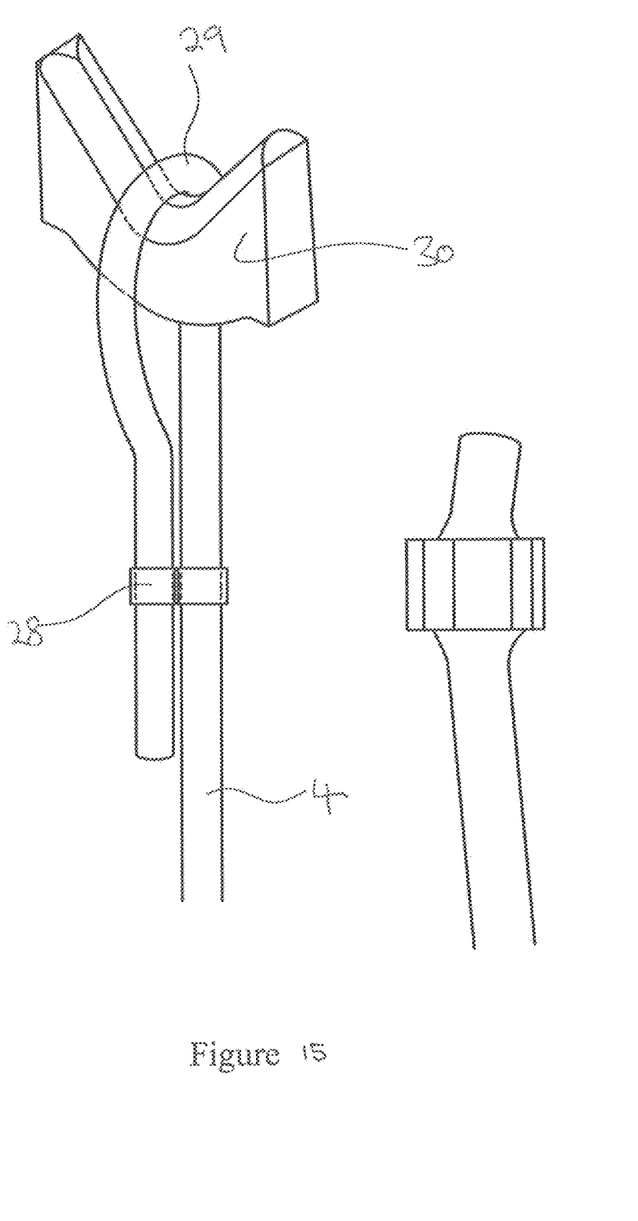
FIG. 15 is a part cross-sectional perspective view of an alternative arrangement of connecting the elastic flexible member to a coupling means.

FIG. 15 shows an alternative arrangement in which the elastic flexible member 4 is bent back upon itself and tied by a crimp or tie 28 to create a short loop 29. Associated with the loop 29 and through which loop passes an additional elongate member 30 the length of which is again greater than the diameter 26 of the inner cylindrical tubular portion 27 (shown in FIG. 14) of both the male and female couplers, thus preventing the loop 29 of the elastic flexible member 4 from being able to go through the inner cylindrical tubular portion 27 of each coupler.

The invention claimed is:
1. An expandable water hose assembly comprising:
a water hose, the water hose comprising:
a flexible outer tube, wherein the flexible outer tube is elastic;

a collapsible water impermeable flexible inelastic inner tube, located inside the outer tube; and an elastic flexible member, located inside the collapsible water impermeable flexible inelastic inner tube; and a first and second coupling means;

the flexible outer tube, the collapsible water impermeable flexible inelastic inner tube, and the elastic flexible member being secured at a first end to the first coupling means and at a second end to the second coupling means;

the flexible outer tube, the collapsible water impermeable flexible inelastic inner tube, and the elastic flexible member being movable from a retracted storage configuration to an extended deployed configuration upon application of water pressure within the expandable water hose assembly;

the elastic flexible member being in an untensioned state whilst in the retracted storage configuration and a tensioned state whilst in the extended deployed configuration;

wherein upon removal of the water pressure from within the expandable water hose assembly the elastic flexible member may return to the untensioned state and applies a retracting force to the expandable water hose assembly to urge the collapsible water impermeable flexible inelastic inner tube into the retracted storage configuration.

2. The expandable water hose assembly as claimed in claim 1, wherein the flexible outer tube comprises elastic warp portions and inelastic weft portions.

3. The expandable water hose assembly as claimed in claim 1, wherein the elastic flexible member comprises a polymer, rubber, or a stretch fabric material.

4. The expandable water hose assembly as claimed in claim 1, wherein the collapsible water impermeable flexible inelastic inner tube comprises a polymer or a rubber material.

5. The expandable water hose assembly as claimed in claim 1, wherein the flexible outer tube comprises a woven material, a knitted fabric, or a webbing material.

6. The expandable water hose assembly as claimed in claim 1, wherein the flexible outer tube and the elastic flexible member are configured to collectively apply the retracting force to the expandable water hose assembly to urge the collapsible water impermeable flexible inelastic inner tube into the retracted storage configuration.

7. The expandable water hose assembly as claimed in claim 1, wherein the flexible outer tube is collapsible.

8. The expandable water hose assembly as claimed in claim 7, wherein the flexible outer tube comprises flexible wall portions moveable between the retracted storage configuration and the extended deployed configuration.

9. The expandable water hose assembly as claimed in claim 8, wherein the flexible wall portions are formed as compressible bellows sections.

10. The expandable water hose assembly as claimed in claim 9, wherein the flexible outer tube further comprises rigid wall portions provided among the bellows sections.

11. The expandable water hose assembly as claimed in claim 1, wherein the flexible outer tube is inelastic.

12. The expandable water hose assembly as claimed in claim 1, wherein the elastic flexible member is cylindrical.

13. The expandable water hose assembly as claimed in claim 1, wherein the elastic flexible member is an elongate band.

14. The expandable water hose assembly as claimed in claim 1, wherein the collapsible water impermeable flexible inelastic inner tube comprises flexible wall portions moveable between the retracted storage configuration and the extended deployed configuration.

15. The expandable water hose assembly as claimed in claim 14, wherein the flexible wall portions are formed as compressible bellows sections.

16. The expandable water hose assembly as claimed in claim 15, wherein the collapsible water impermeable flexible inelastic inner tube further comprises rigid wall portions provided among the bellows sections.

17. The expandable water hose assembly as claimed in claim 1, wherein the collapsible water impermeable flexible inelastic inner tube in the extended deployed configuration radially contacts the flexible outer tube.

18. The expandable water hose assembly as claimed in claim 1, wherein the elastic flexible member is secured within at least one of the first and second coupling means by a flattened crimp member.

19. The expandable water hose assembly as claimed in claim 18, wherein the flattened crimp member has a length greater than a diameter of an inner cylindrical tubular portion of the at least one of the first and second coupling means, and wherein the elastic flexible member protrudes through the inner cylindrical tubular portion.

20. The expandable water hose assembly as claimed in claim 19, wherein the inner cylindrical tubular portion protrudes through the flattened crimp member.

* * * * *